INVENTOR.
PHILLIP R. CORLYON
JOHN C. FLETCHER

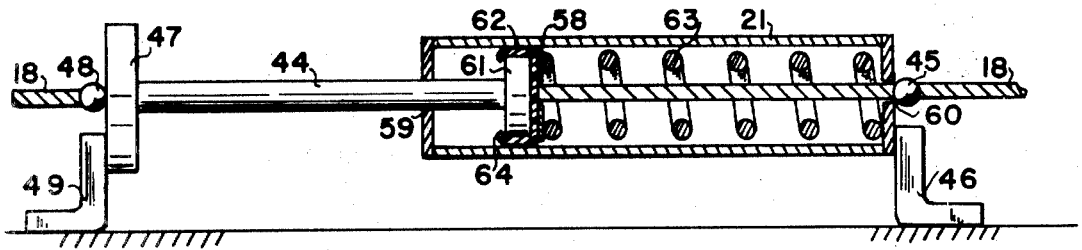
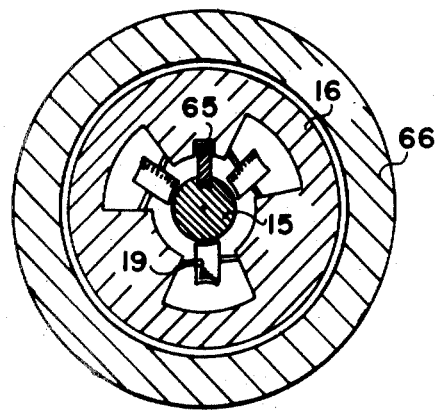
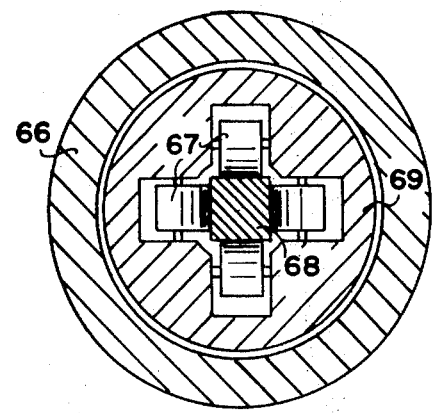
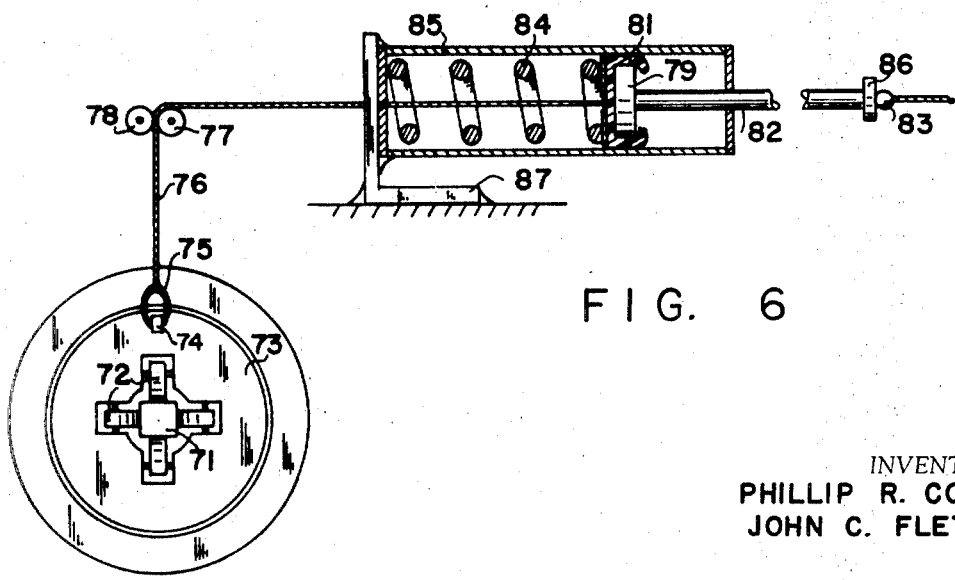

United States Patent Office 3,517,446
Patented June 30, 1970

3,517,446
VEHICLE TRAINER CONTROLS AND CONTROL LOADING
Phillip R. Corlyon, Conklin, and John C. Fletcher, Binghamton, N.Y., assignors to Singer-General Precision, Inc., a corporation of Delaware
Filed Apr. 19, 1967, Ser. No. 631,996
Int. Cl. G09b 9/08
U.S. Cl. 35—12                                    7 Claims

ABSTRACT OF THE DISCLOSURE

One of the primary requirements of a vehicle trainer is the proper simulation of the operation and feel of the primary controls of the vehicle being simulated. This disclosure describes and illustrates one system for primary controls of a fixed-base aviation trainer including the means for changing the feel of those controls as they are operated. The disclosure includes details of construction as well as modifications of various components.

---

This invention relates to a control system, and more particularly to the primary controls for the operation of a vehicle trainer.

Devices which simulate the operation of complex or expensive equipment for training purposes are becoming more and more popular. In fact, as the missions which the equipment must accomplish become more dangerous and as the equipment itself becomes more expensive, the use of simulators to train individuals in the operation of these dangerous and complex devices becomes more necessary. As an example of the manner in which simulators have simplified the problems in training equipment operators, the training of astronauts can be considered. It is rather difficult to place the astronauts in their vehicles in order to train them in the operation of the vehicle itself. Before these men leave the earth's atmosphere, they must have a good idea of how their vehicle operates and what they must do in the various emergencies. To accomplish training in these matters, it is necessary to use devices which realistically simulate the operation of the actual vehicle.

This is true also of larger vehicles such as expensive aircraft, both military and civilian, ships, high-speed trains, even automobiles. The use of simulators to train both the expert and the amateur is becoming more and more advisable. However, for simulator training to be worthwhile, the simulation must be as realistic as possible. Thus, in many simulators the simulation includes simulation of those stimuli that affect as many of the senses as possible. In a vehicle simulator it may be advisable to simulate motion, instrument responses, visual responses, aural responses, and even the tactile responses. For visual simulation, the vehicle should at least have the appearance of the vehicle being simulated. Aural responses include the reproduction of those sounds which would normally accompany the activity in the actual vehicle being simulated. Motion simulation is limited because most vehicle simulators are fixed-base. But probably the most important type of simulation is that of the feel of the controls themselves. To a great extent the operator of a vehicle depends upon his reaction to the feel of the controls in judging the performance and operation of the vehicle itself. Thus, the controls in a vehicle trainer should not only look like the real thing and feel like the real thing, but they should also react like the real thing.

It is an object of this invention to provide a new and improved control system for a vehicle trainer.

It is another object of this invention to provide a new and improved control system for vehicle trainers in which the controls feel and react similarly to the controls of the vehicle being simulated.

It is a further object of this invention to provide new and improved controls for a fixed-base aviation trainer, which controls closely approximate the operation of the actual controls in the aircraft.

Other objects and advantages of this invention will become more apparent as the following description proceeds, which description should be considered together with the accompanying drawings in which:

FIG. 3 is a sectional view of the control loading device of FIG. 2 taken along the line III—III;

FIG. 4 is a sectional view of the shaft and bearing support of FIG. 2 taken along the line IV—IV;

FIG. 5 is a modification of the shaft and bearing support shown in FIG. 4; and

FIG. 6 is a view, partially in section, of a modification of a portion of the system shown in FIG. 2.

Figure 1:
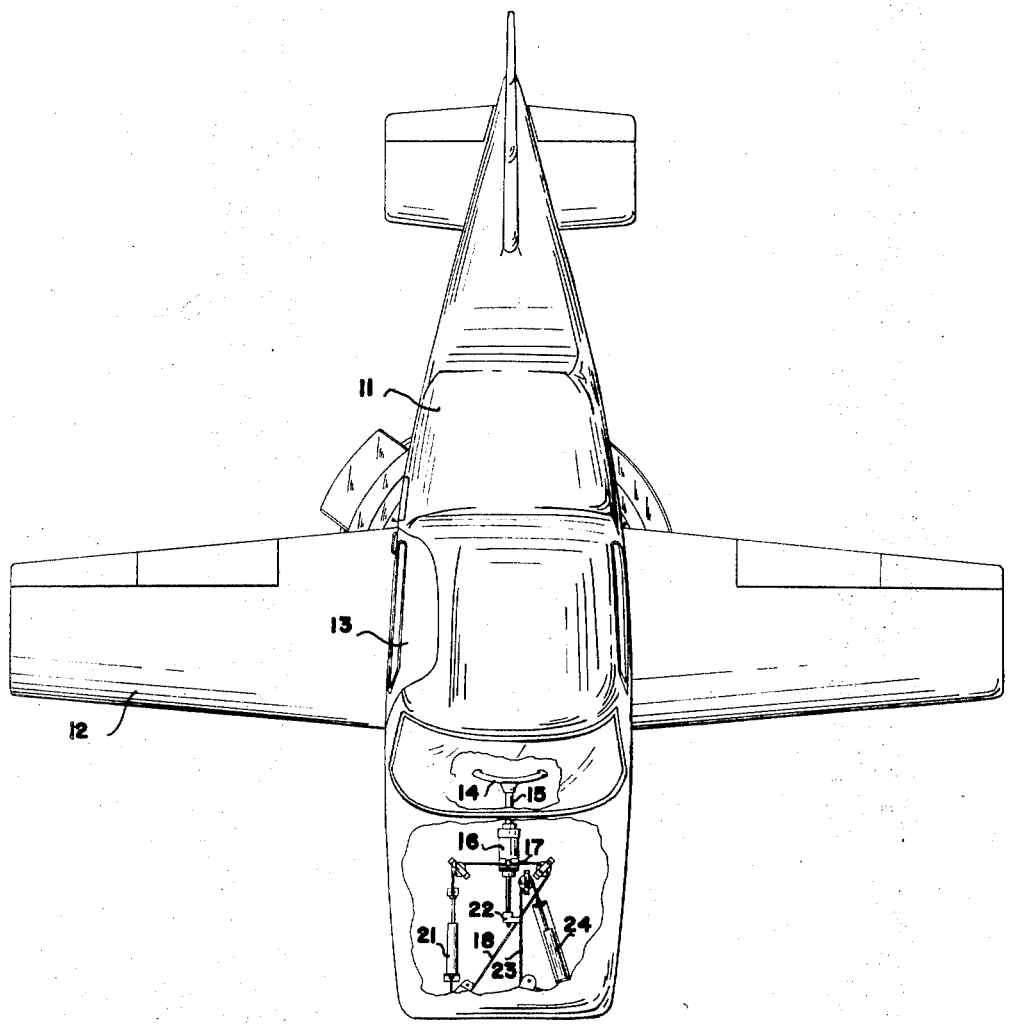
FIG. 1 is a pictorial illustration of the top view of a vehicle trainer showing the location of the controls according to this invention.
Figure 2:
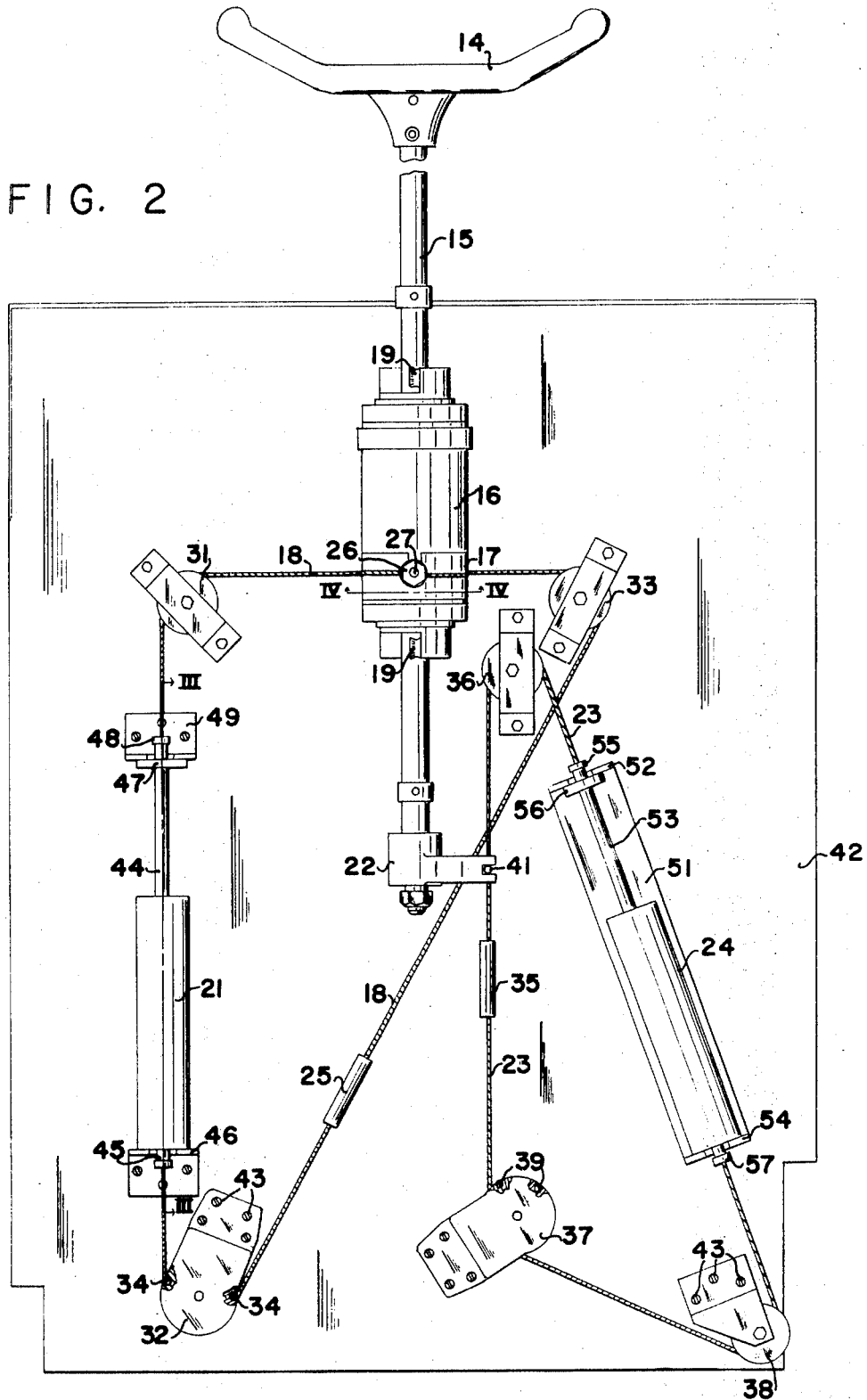
FIG. 2 is a schematic showing of the controls according to this invention.

Referring now to the drawings in detail and more particularly to FIGS. 1 and 2, the reference character 11 designates the fuselage of an aircraft simulator having wings 12 and a cockpit 13. Shown within the cockpit 13 is a control wheel 14 mounted on a movable shaft 15 which is supported in a housing 16. A pulley 17 is fastened to the housing 16 and a cable 18 is wrapped around the drum pulley 17. Connected in the endless cable 18 is a control loading device 21. A fork attachment 22 is connected to the end of the shaft 15 remote from the wheel 14. The fork 22 is connected to a device fastened to a cable 23 in which is attached a control loading device 24. This equipment is shown in FIG. 1 which illustrates these elements sketchily to indicate the orientation of the parts and the general spacial relationships between the vehicle housing or fuselage 11 and the control devices. The details of the control system are better shown in FIG. 2 in which the same elements carry the same reference characters as they do in FIG. 1.

In FIG. 2, which is more complete, the cable 18 is shown as an endless cable with the two ends fastened together by a tensioning means 25. The cable 18 is fastened to the drum 17 by means of a nut 26 mounted on a screw 27. The cable 18 passes over pulleys 31, 32 and 33 to make a triangular loop. The pulley 32 is connected to the shafts of potentiometers, not shown, to convert the movement of the cable 18 into electrical signals. A portion of the pulley 32 is shown in section to indicate the balls which may be swaged onto the cable 18 and which fit in mating holes in the pulley 32 to provide a positive drive thereof.

Similarly, the cable 23 is also an endless cable having its ends fastened together by adjustable tensioning means 35. The cable 23 passes over pulleys 36, 37 and 38 to form a second triangular loop. The pulley 37, a portion of which is shown in section to show the balls 39, drives the shaft of potentiometers which convert the motion of the cable 23 into electrical signals. A generally cylindrical member 41 is attached to the cable 23 and is inserted into the fork 22 between the tines thereof. The entire assembly shown in FIG. 2 is supported on a suitable base 42 by means which are applicable to each individual device such as screws 43 which support the pulley brackets on the base.

The loading device 21 comprises a cylinder and a shaft 44. One end of the cylinder 21 abuts a stop 45 which is attached to the cable 18 and also abuts a stop 46 which comprises a bracket mounted on the base 42. Similarly, the shaft 44 carries an enlarged portion 47 which abuts a stop 48 attached to the cable 18 and a bracket 49 mounted on the base 42. The cylinder 24 is confined within a bracket member 51 which is movably mounted on the base 42. The support member 51 includes a bracket stop 52 at one end against which an enlarged portion of a shaft 53 abuts, and a second bracket portion 54 against which the end of the cylinder 24 abuts. A stop 55 is attached to the cable 23 and bears against the enlarged portion 56 on the piston rod 53, and a stop 57 is mounted on the cable 23 and bears against the end of the cylinder 24.

In operation, the trainee is seated in the cockpit 13 in a position which enables him to suitably and comfortably grasp the wheel 14. For this discussion, only the controls illustrated will be discussed and the other controls, such as the rudder controls, will be ignored, although it is assumed that the trainer will containe these controls also. The wheel 14 mounted on the shaft 15 is attached to devices which control the operation of the trainer. In addition, if desired, the wheel 14 can also control the physical movement of the movable surfaces on the wings 12 and in the tail section. This can be accomplished by any suitable devices and will not be further discussed herein. It is assumed for this discussion that the control of the trainer is electrical in nature. This means that the movement of the wheel 14 must be translated into electrical signals. In the actual aircraft itself, particularly in the smaller aircraft, movement of the wheel 14 mechanically controls the operation of the aircraft parts. In ordinary operation as the aircraft surfaces are moved through their range of movements, the forces required to accomplish further movement become greater. In other words, the controls "feel harder." In a simulator, such as that of FIG. 1, where the control is accomplished electrically, in order to produce realistic simulation, means must be incorporated into the control system to duplicate this change in the feel of the controls. In addition, in normal operation of an aircraft, as in the operation of most vehicles, there is usually a delay between the time when the controls are actuated and the time when the vehicle performs the desired functions. Since, in the normal small aircraft, movement of the wheel 14 is accompanied by mechnical movement of cables, pulleys, and the like, this aspect of the feel of the controls should also be duplicated. This is not a novel concept and many mechanisms have been developed in the past to accomplish these results, but most of the prior art devices have been complex and expensive, and many have been subject to continual maintenance problems. One standard way in which the feel of the control is loaded to duplicate the reaction of normal controls is to bias the control members by means of springs so that as the controls are moved through their ranges, the spring exerts a greater force. One end of the spring may be controlled by a motor which, in turn, is controlled by the simulator computer so that as the air speed, the attitude, the altitude, etc., of the simulated aircraft increases, the motor is operated to increase the loading on the spring itself. This requires an expensive servo system which can readily become unbalanced and which often requires substantial maintenance. The system shown in FIGS. 1 and 2 accomplishes similar results at a very low cost.

The shaft 15 must be capable of movement with two degrees of freedom. The trainee must be able to move the wheel toward the front of the ship and back toward himself. He must also be able to turn the wheel causing the shaft 15 to rotate. Each of these two movements causes a different reaction. To accomplish the necessary control, with the necessary feel, and with inexpensive equipment, the shaft 15 is supported within a housing 16. Rollers 19 are contained in the housing 16 to permit the shaft 15 to move longitudinally and smoothly in the housing. Longitudinal movement of the shaft 15 causes the fork 22 to move. This, in turn, exerts forces on the finger or stop 41, which is attached to the cable 23, driving the cable 23. Since the cable 23 is an endless cable, when it is moved in one direction, it tends to move around its circuit on the pulleys 36, 37 and 38. Motion of the cable 23 around the pulley 37 drives the potentiometers which generate the electrical signals to control the trainer itself. In order to acquire the feel of the controls, the movement of the cable 23 causes the cylinder 24 or the piston rod 53 to move. Assume that the finger 41 is caused to move upwardly as shown in FIG. 2. Then the cable 23 exerts a force on the stop 55 which bears against the enlarged portion 56 on the piston rod 53. This causes the piston rod 53 to be forced into the cylinder 24. Simultaneously, the bracket stop 54 bears against the end of the cylinder 24 preventing that cylinder from moving, and the stop 57, which is also attached to the cable 23, is pulled free from the end of the cylinder 24. When the finger 41 is moved in the opposite direction, downwardly as shown in FIG. 2, the cable 23 rotates in the opposite direction causing the potentiometers connected to the pulley 37 to rotate in the opposite direction. Also, the stop 57 is forced against the end of the cylinder 24 causing the cylinder 24 to move away from the bracket 54. The bracket 52 prevents the piston rod 53 from moving because it bears against the enlarged portion 56, but the stop 55 which is mounted on the cable 23 pulls free from the enlarged portion 56. The cylinder 24 cooperates with the piston rod 53 to change the feel of the wheel 14 as it is moved toward and away from the trainee.

When the trainee rotates the wheel 14, the shaft 15 rotates causing the housing 16 to rotate also. This rotates the drum 17. Since the cable 18 is fixed to the drum 17 by means of the nut 26 tightened on the stud 27, rotation of the drum 17 causes movement of the cable 18. Assuming that the trainee turns the wheel 14 clockwise, the cable 18 will move to force the stop 45 which is attached to the cable 18 against the end of the cylinder 21 driving the cylinder against the piston rod 44. The stop 48, which is also attached to the cable 18, pulls free from the enlarged portion 47 on the piston rod 44. When the trainee rotates the wheel 14 in a counter clockwise direction, the cable 18 is moved in the opposite direction, pulling the stop 48 against the enlarged portion 47 on the piston rod 44 and causing the rod 44 to move into the cylinder 21 while the stop 45 is pulled free from the end of the cylinder 21. In this case, the bracket 46 prevents the cylinder 21 from moving; in the other case, the bracket 49 bears against the enlarged portion 47 to prevent the piston rod 44 from moving. Movement of either the piston rod 44 or the cylinder 21 changes the loading on the drum 17 and the feel of the wheel 14. Movement of the cable 18 causes the pulley 32 to rotate and drives the potentiometer to which that pulley is connected to generate the electrical signals to control the trainer itself. In order to properly assemble the system shown in FIG. 2 so that there is no lost motion, the two ends of the cable 18 are fastened together by the device 25 which incorporates suitable screw thread means to tighten that cable 18 and make it taut. Similarly, the two ends of the cable 23 are tightened by the device 35 to prestress that cable and load the pulleys and the loading devices during assembly. Since in most aircrafts there is a provision for trimming the ship to maintain a fixed attitude without maintaining a constant force upon the control wheel 14, means are included in this control device to accomplish the same results. This comprises the movable support member 51 upon which the cylinder 24 and piston rod 53 are supported. By any suitable means such as cables, jack screws, and the like, the support member 51 is made longitudinally adjustable on the base 42. The trim device which is usually contained in the cockpit 13 is adjusted to move the entire loading assembly including the support 51, the cylinder 24 and the piston rod 53. As this is slowly moved, the cable 23 is similarly moved. This supplies a new servo position for the shaft 15 and also operates the potentiometer 37 to provide a new electrical condition for the control of the simulator.

The control loading is accomplished, as mentioned above, by the operation of the piston rod within the cylinder. To better illustrate this, the cylinder 21 is shown in FIG. 3 in section to show its contents. The cylinder 21 contains a coil spring 63 having one end bearing against the end of the cylinder 21 and the other end bearing against a washer 58 adjacent a leather or plastic cup washer 62 which surrounds a piston 61 mounted on the end of the piston rod 44. The cable 18 is shown broken at each end and the stops 45 and 48 are shown in FIG. 3 as balls swaged on the cable 18. Whether the stops 45 and 48 are balls, cylinders, pins or the like is immaterial to the operation of the device so long as they bear against the appropriate portions of the control mechanism.

When the cable 18 is pulled to the left as shown in FIG. 3, the stop 45 is pulled against the end of the cylinder 21 forcing that cylinder away from the bracket 46 and toward the left. The spring 63 is compressed by the movement of the cylinder 21. Since the other end of the spring 63 bears against the piston 62 on the end of the piston rod 44, there is a force on the rod 44 which tends to drive it to the left also, but the enlarged portion 47 at the end of that rod 44 is blocked from movement by the bracket 49. As the cable moves more and more toward the left, the spring 63 is compressed more and more, increasing the loading on the cable 18. This means that the more the cable 18 moves to the left, the harder it becomes to move. In addition to the action of the spring 63, the piston 62 serves as a dash-pot. So long as the cylinder 21 is moved slowly, there is no build-up of air in front of the piston 62 in the cylinder 21. But should there be a sudden movement of the wheel 14, the cylinder 21 would tend to move rapidly and the action of the piston 62 would be partially resisted by the compression of the air in the cylinder 21. The size of the orifice 59 controls flow of air behind the piston 61. Similarly, when the wheel 14 has been moved and the spring 63 is compressed, and then the wheel 14 is suddenly released, the spring 63 tends to drive the cylinder 21 back to its rest position. However, the sudden rapid movement of the cylinder 21 to its rest position is slowed by the action of the piston 62 in the cylinder 21. The rapid movement of the cylinder 21 causes a compression of the air in the left-hand chamber of that cylinder as the orifice 60 controls the escape of air therefrom and this serves as a dash-pot to slow down the rapid movement of the cylinder 21. The damping of the piston movement can be made critical by controlling the sizes of the orifices 59 and 60. This eliminates overshoot. When the cable 18 is pulled to the right, a similar operation takes place except that the stop 48 drives against the enlarged portion 47 to force the piston rod 44 to the right in the cylinder 21. Actually, whether the piston rod 44 moves to the right or the cylinder 21 moves to the lift, the results of the mechanism contained within the cylinder 21 is the same. Changes in the loading produced by this mechanism and by the rate of the return of the control wheel 14 can be made by changing the spring rates of springs 63 and by changing the sizes of the orifices 59 and 60. In this manner both the force exerted on the wheel 14 and the damping factor produced by the movement of the piston within the cylinder can be modified. The operation of the cylinder 21 and the cylinder 24 are identical.

As mentioned above, the shaft 15 must be mounted for longitudinal movement within a housing 16 and must also be capable of rotation. One means for accomplishing this is shown in FIG. 4 which is a sectional view of the mechanism of FIG. 2 taken along the line IV—IV. The shaft 15 is a generally circular shaft which is mounted in housing 16 by means of rollers 19. There may be several groups of rollers 19 supported within the housing 16 to give the shaft 15 sufficient longitudinal stability. A key 65 supported in a suitable keyway in the shaft 15 and also a keyway in the housing 16 connects the two together. The housing 16 is supported in an outer bearing 66 which may be firmly attached to the base 42 or other stationary devices.

The shaft 15 is permitted to move longitudinally in the housing 16 by the rollers 19. As the shaft 15 moves longitudinally, the rollers 19 turn permitting free movement. Of course, the rollers 19 may be replaced by balls mounted in suitable sockets in the housing 16 or by other similar devices. The key 65 may be firmly attached to the shaft 15 and have a sliding engagement with the housing 16, or the key 65 may be firmly gripped by the housing 16 and have a sliding engagement with the shaft 15. In either case, when the shaft 15 is rotated, it exerts a force upon the key 65, and this, in turn, exerts a torque on the housing 16, causing that housing 16 to rotate in its bearing 66. The bearing 66 is usually fairly short, and the assembly usually includes two such bearings at spaced intervals. Rotation of the housing 16 drives the drum 17 (FIG. 2) to cause the cable 18 to move. Longitudinal movement of the shaft 15 in the housing 16 drives the fork 22 to cause the cable 23 to move (FIG. 2).

The assembly shown in sectional view in FIG. 4 operates, but the use of the key in the keyway provides a source of potential trouble. If the key 65 were firmly gripped by both the shaft 15 and the housing 16, then there would be no lost motion and the rotational forces would be smoothly transmitted from one to the other. However, because of the longitudinal movement which is required for the shaft 15, the key 65 must be free to move in one or the other keyway. This means that the fit of the key 65 in at least one of its keyways is a comparatively loose fit. A loose fit of this type is a source of lost motion and means that the forces applied to the wheel 14 will be suddenly transmitted from the shaft 15 to the housing 16 with a resulting shock and the corresponding danger of shearing the key and binding the key in the keyways.

An alternate embodiment which overcomes many of these disadvantages is shown in FIG. 5, also in section. An outer bearing 66 which may be firmly attached to the base 42 of FIG. 2 or any other suitable stationary means carries within it a rotatable housnig 69 which may be attached in any suitable manner to the drum 17 of FIG. 2. The housing 69 supports in suitable cavities a plurualty of rollers 67, four of which are shown in the embodiment of FIG. 5. A rectangular shaft 68 is supported within the housing 69 on the roller 67.

The shaft 68 is free to move longitudinally on the rollers 67 in the housing 69. The rollers 67 may be so dimensioned as to bear firmly against the shaft 68 to provide a firm guiding means with little friction. At the same time, the shaft 68 may rotate and drive the housing 69 directly through forces applied to the rollers 67. Since the embodiment shown in FIG. 5 may be so constructed that the rollers 67 bear firmly against the shaft 68, there is no lost motion, no shock of force transmission, and no binding when the shaft 68 rotates. Although the rollers 19 shown in FIG. 4 and the rollers 67 shown in FIG. 5 are illustrated as supported upon their own individual shafts, they may merely be dropped into appropriately milled slots in the housings 16 and 69 and be free to rotate therein. For suitable longitudinal support of the shafts 15 and 68, several sets of rollers may be found desirable.

One of the disadvantages of the system shown in FIG. 2 which includes the control loading device shown in section in FIG. 3 is the tendency of the loading device of FIG. 3 to provide too definite a center for the system. Without a system for damping, when the wheel 14 is released, the system tends to suddenly return to center, overshoot, and then hunt slightly about center until further motion is finally damped out. If the damping control of the piston 62 in the cylinder 21 is increased, then the feel of the overall system is modified by too great an extent. On the other hand, some damping must be provided by the piston 62 in the cylinder 21 or oscillatory motion would be even greater. The basic problem in FIG. 2 with respect to oscillation about center is that the mechanism is traveling at its greatest velocity at the time it reaches its center position. This disadvantage is overcome by the system shown schematically in FIG. 6. A generally rectangular shaft 71 is supported on a plurality of rollers 72 which are retained in suitable cavities in housing 73. The housing 73 has a ring or similar fastening means 74 attached to its end face. A loop 75 of a cable 76 passes through the ring 74. The cable 76 passes between a pair of mating rollers 77 and 78 and through pistons 79 and 81. A stop 83, which may be a ball, cylinder or the like fastened to the cable 76, bears against an enlarged portion 86 on the end of a piston rod 82. A coil spring 84 contained within a cylinder 85 has one end bearing against the end of the cylinder 85 and the other end bearing against the piston 81. The cylinder 85 is supported on a bracket 87 mounted by any suitable means on a base.

When the shaft 71, the end of which may be connected to the wheel 14 of FIGS. 1 and 2, is rotated, it transmits torque through the rollers 72 to the housing 73 causing the housing 73 to rotate also. As the housing 73 rotates, it causes movement of the ring 74 which pulls on the loop 75 causing the cable 76 to move. The cable 76 moves between the two mating rollers 77 and 78 either one of which may be connected to a potentiometer to generate electrical signals indicative of the position of the cable 76. As the cable 76 is moved, it pulls on the stop 83 which is connected to it and drives the piston rod 82 by moving against the enlarged portion 86. As a result, the piston 79 and 81 move within the cylinder 85 to compress the coil spring 84 between the end of the cylinder 85 and the piston 81. Release of the shaft 71 permits the compressed spring 84 to drive the pistons 79 and 81 back, pulling the cable 76 and rotating the housing 73 and the shaft 71 back to their home positions.

Rotation of the shaft 71 in either direction causes the cable 76 to move in the same direction. The amount of rotation of the shaft 71 and the housing 73 in either direction causes the same amount of movement of the cable 76. In a system of this type, when the mechanism is returning to its zero position, its acceleration is at a maximum but its velocity is at a minimum. Therefore, the feel of the mechanism about the center position more nearly approximates the feel of the control mechanism in an aircraft. In an aircraft when the control wheel 14 returns to its home position, there appears to be little restraining forces on the wheel; it feels "mushy." This is the type of reaction that is created by the mechanism shown in FIG. 6. The center or home position of the shaft 71 is not as clearly defined as it is in the system shown in FIG. 2. Also, the forces returning the mechanism to its home position are much, much lower in the device of FIG. 6 than in the system of FIG. 2, virtually eliminating hunting about the center. It was mentioned above that the potentiometers which control the trainer could be connected to either of the rollers 77 or 78. This is true only if there is no requirement for directional information. If directional information is required, then the potentiometers must be driven from the shaft 71 or from the housing 73 because the rollers 77 and 78 rotate in the same direction regardless of which direction the wheel 14 is turned.

The above specification has described and illustrated a new and improved primary control system for vehicle trainers. The control system of this specification is effective, yet inexpensive to construct, and requires little maintenance in operation. It is realized that a consideration of the above disclosure may indicate to those skilled in the art additional ways in which the principles of this invention may be utilized without departing from its spirit. It is, therefore, intended that this invention be limited only by the scope of the appended claims.

What is claimed is:

1. A control loading system for providing a realistic feel to the movement of a simulated control member in a fixed-base vehicle simulator, said system comprising, in combination:
    (a) a manually engageable portion on said control member;
    (b) an elongated shaft extending fixedly from said manually engageable portion;
    (c) housing means supporting said shaft for reciprocal longitudinal movement and for reciprocal rotational movement about its longitudinal axis;
    (d) a first elongated, flexible coupling member movable with said shaft during said longitudinal movement thereof;
    (e) a second elongated, flexible coupling member movable with said shaft during said rotational movement thereof;
    (f) first converter means for generating electrical signals commensurate with the direction and magnitude of movement of said first coupling member;
    (g) second converter means for generating electrical signals commensurate with the direction and magnitude of movement of said second coupling member;
    (h) first biasing means resiliently urging said first coupling member, and thereby said shaft, toward a reference position of said longitudinal movement and providing a predetermined force opposing movement away from said longitudinal reference; and
    (i) second biasing means resiliently urging said second coupling member, and thereby said shaft, toward a reference position of said rotational movement and providing a predetermined force opposing movement away from said rotational reference.

2. The invention according to claim 1 wherein said first and second coupling members comprise first and second endless, flexible cables.

3. The invention according to claim 2 wherein said first and second converters comprise rotatable members, respectively driven by said first and second cables.

4. The invention according to claim 1 wherein said first and second biasing means each comprise a coil spring arranged within a hollow cylinder having an end wall at one end, a piston reciprocally movable within said cylinder, said spring having its opposite ends bearing against said end wall and said piston, and means for moving said piston and cylinder relative to one another to compress said spring in response to movement of the respective coupling member.

5. The invention according to claim 4 wherein said piston is movable in substantially air-tight engagement within said cylinder and the latter is provided with end walls at both ends each having an orifice for controlled intake and exhaust of air as said piston is moved, thereby damping movement of said piston, said coupling members and said shaft.

6. The invention according to claim 1 wherein said shaft extends through said housing means and is keyed thereby to transmit said rotational movement of said shaft to said housing means and said second coupling member is affixed to said housing for movement in response to rotation thereof.

7. The invention according to claim 1 wherein said shaft extends through said housing means and includes external surface areas mating with portions of said housing means to transmit said rotational movement of said shaft to said housing and said second coupling member is affixed to said housing for movement in response to rotation thereof.

References Cited

UNITED STATES PATENTS

| | | | |
|---|---|---|---|
| 2,330,711 | 12/1943 | Barber | 35—12 |
| 2,851,795 | 9/1958 | Sherman | 35—12 |
| 3,024,539 | 3/1962 | Rider | 35—12 |
| 3,310,884 | 3/1967 | Weitzman et al. | 35—12 |

EUGENE R. CAPOZIO, Primary Examiner

P. V. WILLIAMS, Assistant Examiner